United States Patent [19]

Schuricht

[11] 4,344,332

[45] Aug. 17, 1982

[54] LOAD BEARING OSCILLATOR DRIVE

[75] Inventor: Henry A. Schuricht, Pontiac, Mich.

[73] Assignee: Amsted Industries Incorporated, Chicago, Ill.

[21] Appl. No.: 196,686

[22] Filed: Oct. 14, 1980

[51] Int. Cl.³ .................... F16H 25/08; F16H 25/16
[52] U.S. Cl. .................................. 74/54; 74/571 M; 74/836; 308/158; 308/163
[58] Field of Search ............... 74/54, 571 R, 571 L, 74/571 M, 568, 835, 836; 308/158, 163, 231

[56] References Cited

U.S. PATENT DOCUMENTS

| | | | |
|---|---|---|---|
| 2,200,101 | 5/1940 | Schmitter | 474/25 |
| 2,503,521 | 4/1950 | Stover | 74/54 |
| 2,536,213 | 1/1951 | Plotts | 74/571 |
| 2,561,344 | 7/1951 | Cutler et al. | 74/571 |
| 3,393,022 | 7/1968 | Alven et al. | 308/231 |
| 3,613,869 | 10/1971 | Schuricht | 198/772 |
| 3,678,781 | 7/1972 | Rohrberg et al. | 74/571 M |
| 4,259,043 | 3/1981 | Hidden et al. | 308/231 |

*Primary Examiner*—Lawrence J. Staab
*Attorney, Agent, or Firm*—Edward J. Brosius; Fred P. Kostka; Tony T. Shu

[57] ABSTRACT

A drive to reciprocate a vertical support member such as a shaft includes a journal support assembly which carries a lower end of the shaft while allowing rotational movement of the shaft. Located above the support assembly and attached to the vertical member is a reciprocation arm having a cam guide attached to its outer end. A cam assembly including an eccentrically offset cam bearing is disposed within the cam guide. The cam assembly is operatively connected to a source of rotary power which when energized reciprocates the support member in a selective oscillating cycle.

1 Claim, 8 Drawing Figures

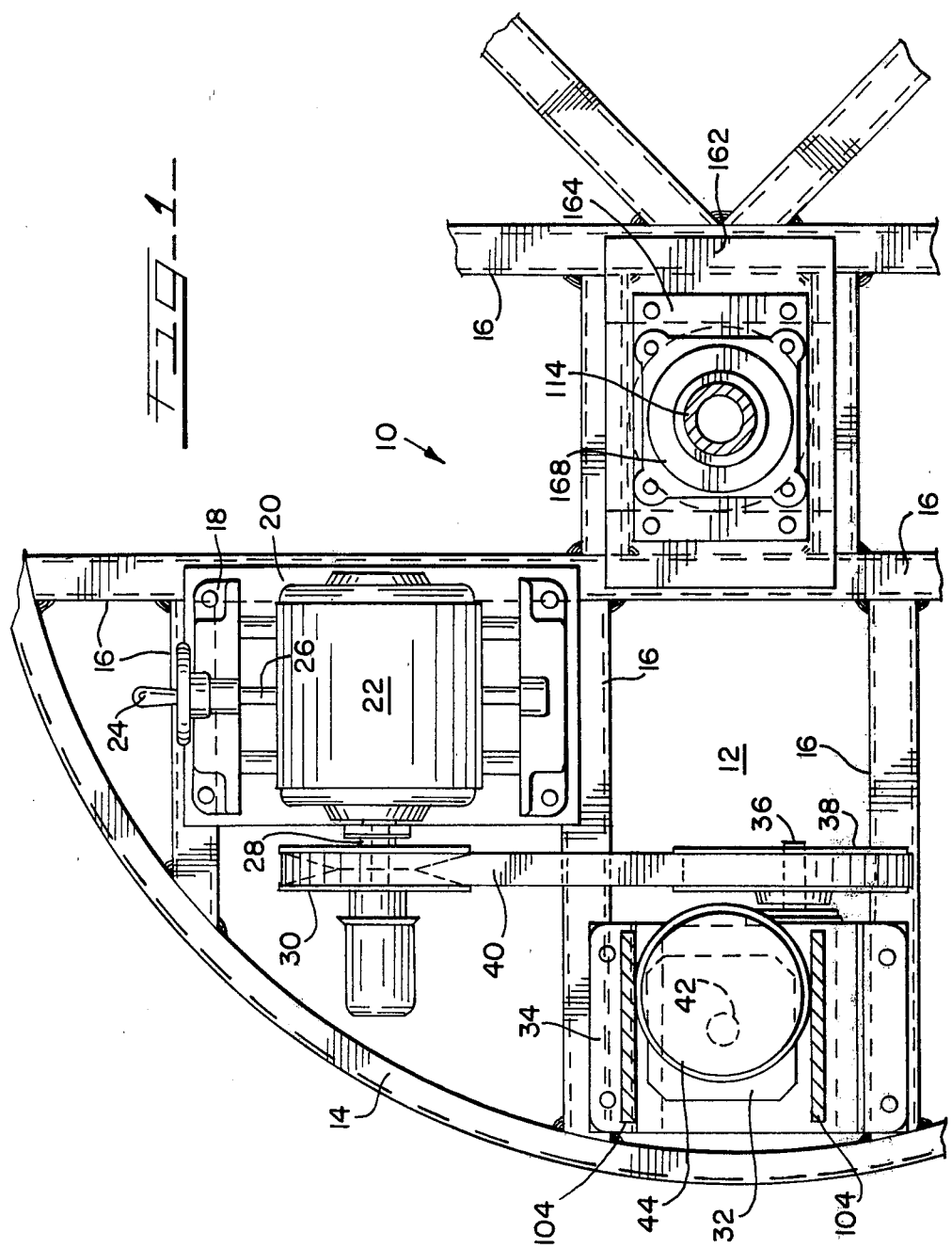

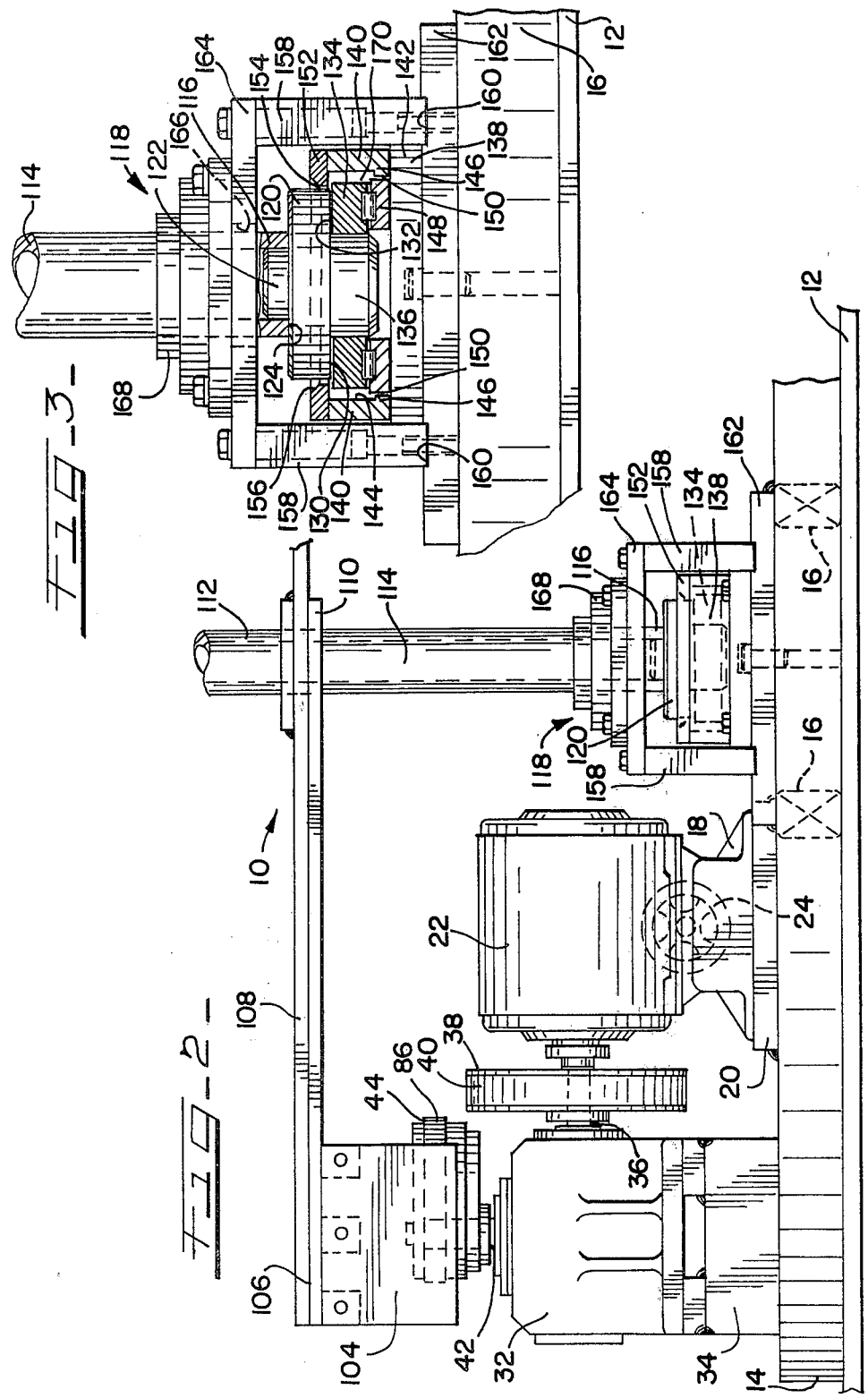

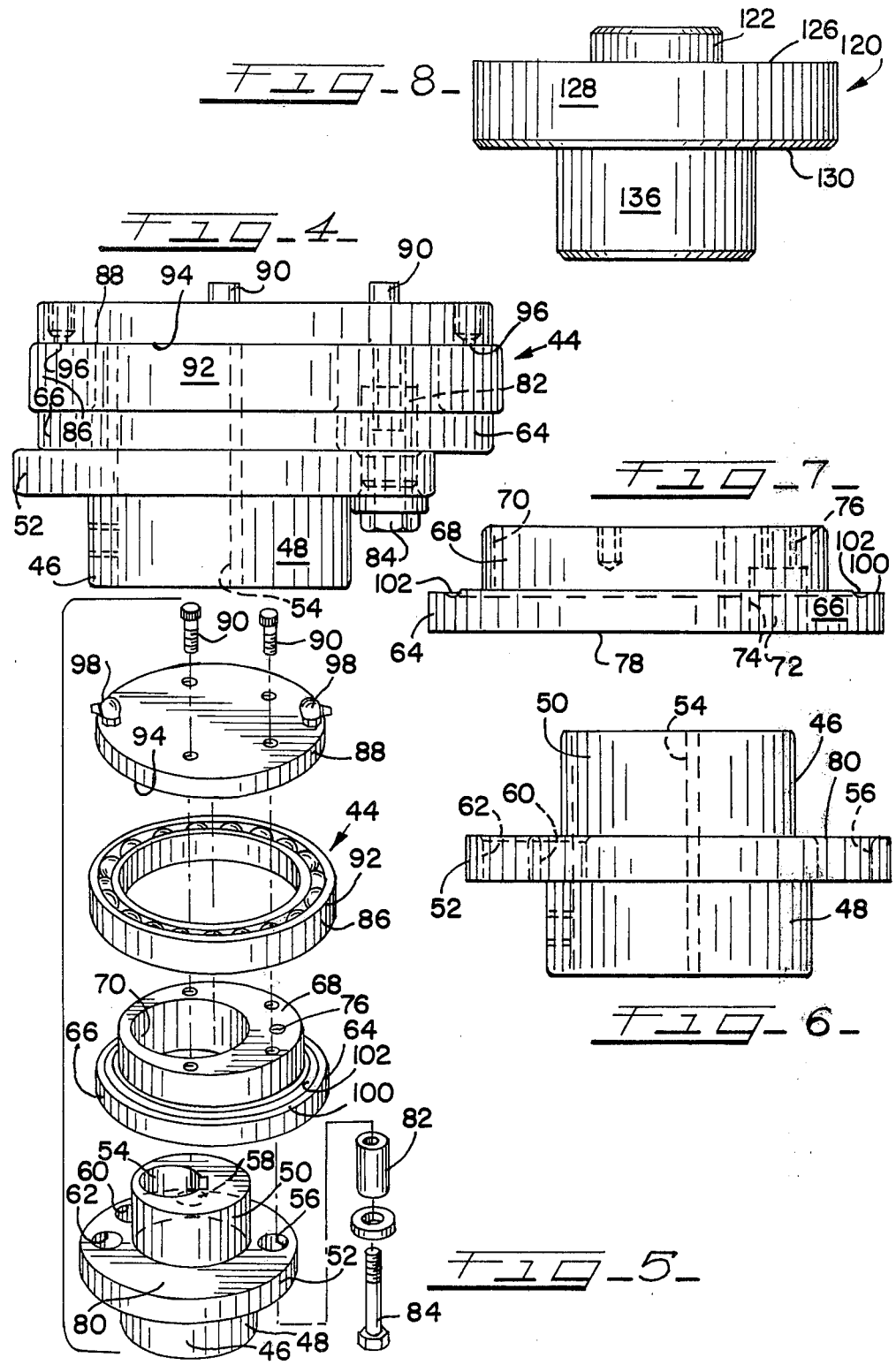

LOAD BEARING OSCILLATOR DRIVE

BACKGROUND OF THE INVENTION

1. Field of the Invention

This invention relates to drive arrangements for mechanical devices and more particularly to a drive for oscillating a vertical load bearing member which may be associated with material handling equipment.

2. Prior Art

Machines, particularly those which are adapted for material handling functions, often require special drive arrangements to produce a selective pattern of movement.

For example, U.S. Pat. No. 3,613,869 discloses a drive operatively connected to a cylindrical-shaped parts accumulator. This drive lifts and lowers the accumulator while at the same time reciprocates such about its vertical axis.

Another example of a specialized type drive is disclosed in co-pending U.S. patent application Ser. No. 903,951. This drive includes a source of rotary power operatively connected to a cam assembly having an eccentrically offset bearing. The bearing interacts with spaced guide plates which in turn are connected to a drum carried by a set of triangular spaced supports.

SUMMARY OF THE INVENTION

The oscillator drive of this invention may include a base plate to support a source of rotary power such as an electric motor. Connected to the motor is a rotational rate reduction device which includes means to alter the degree of reduction provided. An output of the reduction device connects with an eccentric cam assembly. The assembly is adjustable so that the amount of eccentricity may be varied.

The cam assembly interacts with a pair of spaced guide plates attached to the outer end of a reciprocating arm. The arm in turn is connected to a vertical support member having a base so journaled that the member is free to be oscillated while at the same time support a load.

The oscillator drive of this invention provides several advantages over other like devices presently known.

First, the amplitude of frequency of the oscillating cycle of the drive may be readily altered to meet varying requirements.

Next, the drive may support a load and oscillate such without the need for auxiliary bracing.

Further, the drive is relatively simple to provide dependable and relatively maintenance-free operation.

DESCRIPTION OF THE DRAWINGS

FIG. 1 is a plan view of a load bearing oscillator drive incorporating this invention.

FIG. 2 is a side elevational view of the drive of FIG. 1.

FIG. 3 is a detailed elevational view in partial section of a support journal assembly for a load bearing column portion of the drive of FIG. 1.

FIG. 4 is a detailed side elevational view of a cam assembly forming part of the drive of FIG. 1.

FIG. 5 is a perspective explosion view of the cam assembly of FIG. 4.

FIG. 6 is a side elevational view of a hub portion of the cam assembly of FIG. 4.

FIG. 7 is a side elevational view of a flange portion of the cam assembly of FIG. 4.

FIG. 8 is a side elevational view of a pilot insert forming part of the support journal assembly of FIGS. 3 and 4.

DESCRIPTION OF THE PREFERRED EMBODIMENT

A load bearing oscillator drive is shown generally in FIGS. 1 and 2 and designated 10. The drive 10 includes a base plate 12 which may be formed in a number of convenient shapes and in this embodiment is round. Attached to the plate 12 is a peripheral rim 14 to which ends of a series of cross members 16 are connected. The members 16 are so spaced to provide support for the various components of the drive 10.

An adjustable motor mount 18 is affixed to a motor base plate 20 which in turn is fastened to the cross members 16. The mount 18 carries an electric motor 22. The horizontal location of the motor 22 may be adjusted by rotation of a handle 24 connected to a threaded shaft 26.

On a drive shaft 28 of the motor 22 is a variable speed drive pulley 30. The motor 22 connects with a 40 to 1 ratio gear reducer 32 carried on an elevated base 34 attached to the cross members 16. To an input shaft 36 of the gear reducer 32 is fastened a driven pulley 38 which is operatively connected to the variable speed drive pulley 30 by a belt 40. An output shaft 42 of the gear reducer 32 is vertically positioned and carries an eccentric cam assembly 44 which is discussed below in detail and shown in FIGS. 4–7.

The cam assembly 44 includes a hub portion 46 comprising a lower circular post 48 separated from an upper circular post 50 by an annular support rim 52. An eccentrically offset keyed shaft aperture 54 is formed through the posts 48, 50 and the rim 52 for disposition of the gear reducer output shaft 42. In the rim 52 are a set of pilot holes 56, 58, 60 and 62. The pilot holes 56–62 are spaced equidistant from a center of the hub portion 46 while spaced at varying distances from a center of the shaft aperture 54.

The eccentric cam assembly 44 further includes a bearing support flange 64 defined by a lower annular rib 66 joined to an upper bearing positioning portion 68. Through the rib 66 and the upper positioning portion 68 is an eccentrically offset post aperture 70. In the rib 66 is a single pilot aperture 72 defined by a lower sleeve portion 74 and an upper threaded portion 76. The bearing support flange 64 is disposed on the hub portion 46 with the hub upper post 50 positioned within the flange hub post aperture 70 and with a lower surface 78 of the flange annular rib 66 in contact with an upper surface 80 of the hub support rim 52.

An axial position of the flange 64 on the hub 46 may be adjusted so as to incrementally vary the degree of eccentricity of the flange bearing positioning portion 68, for example, from proximately zero to six and one-half degrees on substantially equal increments. Once the particular amount of eccentricity is selected, the relative position of the hub 46 and the flange 64 may be fixed. A sleeve 82 is inserted into the lower sleeve portion 74 of the flange pilot aperture 72 and into, for example, the hub pilot aperture 56. The sleeve 82 is then secured with a bolt 84 in engagement with the flange pilot aperture threaded portion 76.

The cam assembly is completed by placing a ball-type bearing 86 on the bearing support flange 64. Lastly, a circular retaining plate 88 is fastened to the flange 64 by screws 90 threadedly engaged into the flange positioning portion 68. The height of the portion 68 is sufficiently greater than a thickness of the bearing 86 to allow free rotation of an outer race 92 of the bearing 86. On a bottom surface 94 of the retaining plate 88 is a circular lubrication groove 96 which connects with a set of grease fittings 98. A top surface 100 of the flange rib 66 is formed with a like lubricating groove 102 so that the bearing 86 may be lubricated from both sides.

The outer diameter of the bearing 86 is sufficiently greater than that of the flange rib 66 and the retaining plate 88 so that the outer race 92 may continuously engage with a pair of spaced guide plates 104. The guides plates 104 are carried at an outer end 106 of an oscillating arm 108. An inner end 110 of the arm 108 in turn connects with a vertical load support column 112 which may comprise a tubular shaft 114.

A lower end 116 of the shaft 114 is carried by a support journal assembly 118. The assembly 118 includes a pilot insert 120 which is shown in detail in FIG. 8. The insert 120 has an upper circular shaped boss 122 which fits within the tubular shaft 114 such that a bottom end 124 of the shaft 114 is in contact with a top surface 126 of an annular support flange 128 of the insert 120. A bottom surface 130 of the insert flange 128 in turn engages with a top horizontal face 132 of a thrust type bearing 134. A lower circular shaped boss 136 of the insert 120 in turn fits within the bearing 134 with a snug fit.

The bearing 134 is contained by a housing 138. The housing 138 is defined by a circular-shaped sidewall 140 joined to a rectangular shaped bottom member 142. An inner surface 144 of the sidewall 146 is formed with a bottom offset portion 146 so that a bottom portion 148 of the bearing 134 fits more snugly but still loosely within the bottom offset 146. This looseness is sufficient to form a space 150 therebetween. To the bearing housing 138 is attached a retaining ring 152 having an inner aperture 154 to loosely receive the flange 128 of the insert 120. The aperture 154 includes an upper chamfered edge portion 156.

The lower member 142 of the housing 138 is positioned between spaced uprights 158 which in turn are located in grooves 160 formed in a base plate 162. The base plate 162 in turn is fastened to the cross members 16. Attached across upper ends of the uprights 158 is horizontal support member 164 having an inner shaft opening 166 for a loose disposition of the shaft 114. To the member 164 is fastened a flange-type bearing 168. The bearing 168 interacts with the shaft lower end 116 to allow the shaft 114 to rotate about its vertical axis while at the same time maintaining the vertical orientation of the shaft 114.

During operation of the drive 10, the motor 22 is energized to produce rotation of the motor drive shaft 28 proximating 1750 rpm. By regulation of the adjustable speed pulley 30, the ratio of the diameter of the driven pulley 38 to the diameter of the adjustable speed pulley 30 can be varied from 1:1 to 3:1, for example. Since the gear reducer 32 has a fixed input-to-output ratio of 40:1, rotation of the cam assembly 44 may be varied from proximately 45 rpm to 15 rpm. With each adjustment of the speed pulley 30 the position of the motor 32 also is adjusted by manipulation of the handle 24 of the adjustable motor base 18. Thus, the belt 40 may be maintained with the proper tightness.

Depending on the length of the arm 108 and the amount of eccentricity provided by selection of one of the set of pilot holes 56–62, the cam assembly 44 rotates to oscillate the load bearing column 112 in a cycle having a selective amplitude. For example, where the distance between a vertical axis of the gear reducer output shaft 42 and the vertical axis of the column 112 is proximately 26 inches, the amplitude of the cycle can be set at 16, 18, 20 or 22 degrees. Thus, the amplitude and the frequency of the oscillating cycle may be varied to meet the requirements of a particular application.

As the eccentric cam assembly 44 rotates, the load bearing column 112 is oscillated about its longitudinal axis, and as shown, the longitudinal axis is coincidental with a vertical axis of the shaft 114. A load on the shaft 114 is transferred to the insert 120. The insert 120 in turn transfers the load to the thrust-type bearing 134 which supports the load while allowing free oscillation of the shaft 114. During this oscillation, the flange-type bearing 168 maintains the vertical orientation of the shaft 114 while also allowing free oscillation thereof.

Note that the location of the thrust bearing 134 is self-adjusting so that it aligns naturally with the flange-type bearing 168. This self-alignment is provided by the space 150 between the bearing 134 and the bottom offset 146 of the housing sidewall 140.

During oscillation of the column 112, the thrust bearing 134 may be maintained in a lubricated condition by filling a reservoir space 170 formed between the housing sidewall 140 and the bearing 134. The chamfered edge portion 156 of the retaining ring aperture 154 allows additional lubricant to be easily added as required.

While various modifications may be suggested by those versed in the art, it should be understood that I wish to embody within the scope of the patent warranted hereon all such modifications as reasonably and properly come within the scope of my contribution to the art.

What is claimed is:

1. An oscillator drive particularly adapted to support a vertically imposed load and oscillate such in a cycle having a selective frequency and amplitude, an improvement in said drive comprising:

a source of rotary power, rotational rate reduction means connected to an output of said power source to produce a rotary output having a substantially reduced rotational rate, eccentric cam assembly means operatively connected to said rate reduction means rotary output to convert said output to an oscillating output, said means comprising a hub portion having an eccentrically located aperture for disposition of an output shaft of said rate reduction means, a flange portion having an eccentrically located aperture for disposition of an upper post of said hub portion, a bearing carried by said flange portion and a retainer plate fastened to said hub to secure said bearing to said flange, an angular position of said flange portion relative to said hub portion being adjustable to set an eccentric position of said bearing at varying increments, a load bearing column operatively connected to said cam assembly means by an elongated member having spaced guide plates in contact with said cam assembly bearing, said column carried by a support journal assembly means to maintain a position of said column in proximate alignment with said load while allowing a free oscillation of said column about a longitudinal axis of said column, said support journal assembly means including,
a pilot insert having an upper and lower boss connected to a flange and spaced apart by said flange, said upper boss insertable into an open end of said column with a top surface of said flange in contact with a bottom of said column,
a thrust-type bearing having an upper portion in contact with a lower surface of said insert flange,
a housing to carry said bearing, said housing having a circular sidewall forming a lower inner offset to receive a lower portion of said bearing with a loose fit to provide a space for self-centering of said bearing within said lower inner offset, and a retaining ring fastened to said housing sidewall, said ring formed with an aperture for disposition of said insert flange with said aperture having a chamfered edge portion to facilitate a lubricant addition to said housing for said thrust-type bearing, and
a flange-type bearing in contact with said column above said bottom of said column, said flange-type bearing carried by a horizontal support member located above said housing and carried by spaced uprights positioned on each side of said housing,
wherein energization of said power source causes said output shaft of said rate reduction means to rotate said cam assembly at a rate substantially less than a rate of said power source, said cam assembly interacting with said member guide plate to oscillate said column about its longitudinal axis,
wherein said thrust-type bearing supports said load imposed on said column with said thrust-type bearing adjusting in position to align with said load while allowing said column to freely oscillate about its longitudinal axis and said flange-type bearing maintains said longitudinal axis of said column in alignment with said load while allowing said column to freely oscillate about said longitudinal axis.

* * * * *